United States Patent [19]
Choe

[11] Patent Number: 6,009,093
[45] Date of Patent: Dec. 28, 1999

[54] APPARATUS AND METHOD FOR INTERFACING PRIVATE EXCHANGE TO INTEGRATED SERVICES DIGITAL NETWORK

[75] Inventor: Jae-Weon Choe, Yongin, Rep. of Korea

[73] Assignee: SamSung Electronics Co., Ltd., Kyungki-do, Rep. of Korea

[21] Appl. No.: 08/851,341

[22] Filed: May 5, 1997

[30] Foreign Application Priority Data

May 4, 1996 [KR] Rep. of Korea .................. 96-14581

[51] Int. Cl.[6] .................. H04L 12/50; H04L 12/28; H04L 12/56; H04Q 11/00
[52] U.S. Cl. .................. 370/376; 370/524; 370/420
[58] Field of Search .................. 455/557; 370/465, 370/522, 524, 376, 419, 469, 420, 421; 379/93.05, 93.06, 93.07, 93.09, 219, 220, 225, 229, 231–234, 240, 399

[56] References Cited

U.S. PATENT DOCUMENTS

| | | |
|---|---|---|
| 4,998,248 | 3/1991 | Matsuzaki . |
| 5,305,312 | 4/1994 | Fornek et al. . |
| 5,305,313 | 4/1994 | Katoh . |
| 5,450,396 | 9/1995 | Havermans . |
| 5,450,486 | 9/1995 | Maas et al. . |
| 5,481,598 | 1/1996 | Bergler et al. . |
| 5,481,605 | 1/1996 | Sakurai et al. . |
| 5,530,692 | 6/1996 | Avargues et al. .................. 370/15 |
| 5,550,913 | 8/1996 | McMaster et al. . |
| 5,557,663 | 9/1996 | Huang et al. . |
| 5,566,301 | 10/1996 | Koz et al. . |
| 5,621,731 | 4/1997 | Dale et al. . |

OTHER PUBLICATIONS

Stallings, ISDN & Broadband ISDN with Frame Relay & ATM, pp. 122–159;201–215; and 226–247, 1995.

*Primary Examiner*—Dang Ton
*Assistant Examiner*—David R Vincent
*Attorney, Agent, or Firm*—Robert E. Bushnell, Esq.

[57] ABSTRACT

In an apparatus and a method for interfacing a private exchange to an ISDN, the apparatus controls intralayer and interlayer entity communications to interface the private exchange to the ISDN. The apparatus is disposed in a universal card slot of a subscriber shelf of the private exchange in the form of a card to accommodate an ISDN terminal in the private exchange or connect the private exchange to an ISDN public network, thereby enabling voice and data communications.

18 Claims, 10 Drawing Sheets

APPARATUS AND METHOD FOR INTERFACING PRIVATE EXCHANGE TO INTEGRATED SERVICES DIGITAL NETWORK

CLAIM FOR PRIORITY

This application makes reference to, incorporates the same herein, and claims all benefits accruing under 35 U.S.C. §119 from an application for APPARATUS AND METHOD FOR INTERFACING PRIVATE EXCHANGE TO INTEGRATED SERVICES DIGITAL NETWORK earlier filed in the Korean Industrial Property Office on May 4, 1996, and there duly assigned Ser. No. 14581/1996.

BACKGROUND OF THE INVENTION

1. Technical Field

The present invention relates to integrated services digital network communications, and more particularly relates to an apparatus and method for controlling intralayer and interlayer entity communications to interface a private exchange to an integrated services digital network (ISDN).

2. Related Art

Generally, a conventional telephone network or data network is a dedicated service network intended to provide only specific communication service such as telephone service or data service to terminal subscribers. Typically, key phone systems and other private exchanges are connected to a public switched telephone network (PSTN) to provide voice communication service. In contrast to the conventional telephone network, an integrated services digital network (ISDN) offers a variety of new features including multimedia communication service such as voice, high speed data and image communication services and other additional non-voice communication services via network interfaces on the basis of digitization of the telephone network. Contemporary ISDN communication systems including private exchanges are disclosed, for example, in U.S. Pat. No. 4,998,248 for Integrated Services Digital Network (ISDN) System And Multimedia Data Connection Method In Same System issued to Matsuzaki, U.S. Pat. No. 5,305,312 for Apparatus For Interfacing Analog Telephones And Digital Data Terminals To An ISDN Line issued to Fornek et al., U.S. Pat. No. 5,450,396 for Communication System And A Private Branch Exchange To Be Used In Such A Communication System issued to Havermans, and U.S. Pat. No. 5,621,731 for Private Exchange For ISDN issued to Dale et al.

As the ISDN communication systems become widely in use, the private exchange and its terminal stations connected to the ISDN must effectively accommodate multimedia communication services and a variety of other additional services through the ISDN. ISDN interfaces must be provided in the private exchange on the basis of network interface standards. Exemplary ISDN interfaces for an ISDN communication system are disclosed in U.S. Pat. No. 5,305,313 for Electronic Switching System For Use In Connection To An ISDN And Method Of Setting Communication Disconnection Reasons issued to Katoh, U.S. Pat. No. 5,450,486 for Telecommunication System And A Linecard issued to Maas et al., U.S. Pat. No. 5,481,598 for Subscriber Terminal For ISDN Networks issued to Bergler et al., U.S. Pat. No. 5,557,663 for Multi-Media Communication System With Integrated And Coherent Audio-Video User Interface Allowing Flexible Image Input issued to Huang et al., and U.S. Pat. No. 5,566,301 for ISDN Audiovisual Teleservices Interface Subsystem issued to Koz et al. While these ISDN interfaces are implemented in accordance with network interface standards, I have noted that further improvement for interfacing a private exchange to an ISDN can still be contemplated.

SUMMARY OF THE INVENTION

Accordingly, it is an object of the present invention to provide an improved apparatus and method for interfacing a private exchange to an ISDN.

It is another object to provide an apparatus and method for layering the interface of a private exchange to an ISDN in accordance with an open systems interconnection (OSI) reference model.

It is also an object to provide an interface apparatus having a layered architecture based on an OSI reference model mounted in a universal card slot of a subscriber shelf of a private exchange and connected to an ISDN for exchanging voice and data communications between said private exchange and ISDN.

These and other objects of the present invention can be achieved by an apparatus for interfacing a private exchange with a central processing module to an ISDN which comprises a network interface connected directly to the ISDN; an exchange main module interface connected to the private exchange for communicating with the central processing module; and a memory for storing call processing interface and ISDN protocol control programs for the connection of the private exchange to the ISDN. A time switch controller is connected to the exchange main module interface for controlling speech path connections between at least one B-channel of the network interface and at least one B-channel of the exchange main module interface and for performing the conversion between pulse code modulation (PCM) interface frame structure and ISDN oriented modular interface frame structure. A layer-1 controller is connected between the time switch controller and the network interface, for performing conversion between a user/network interface frame structure and an ISDN oriented modular interface frame structure. A layer-2 controller is connected between the time switch controller and the layer-1 controller for controlling one or more D-channels and for transferring a link access procedure on the D-channel frame received from a physical layer of the OSI reference model to a D-channel of the associated port, or for reading D-channel data received at each port, producing a link access procedure on the D-channel frame on the basis of the read data, and transferring the produced link access procedure on the D-channel frame to the physical layer of the OSI reference model.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
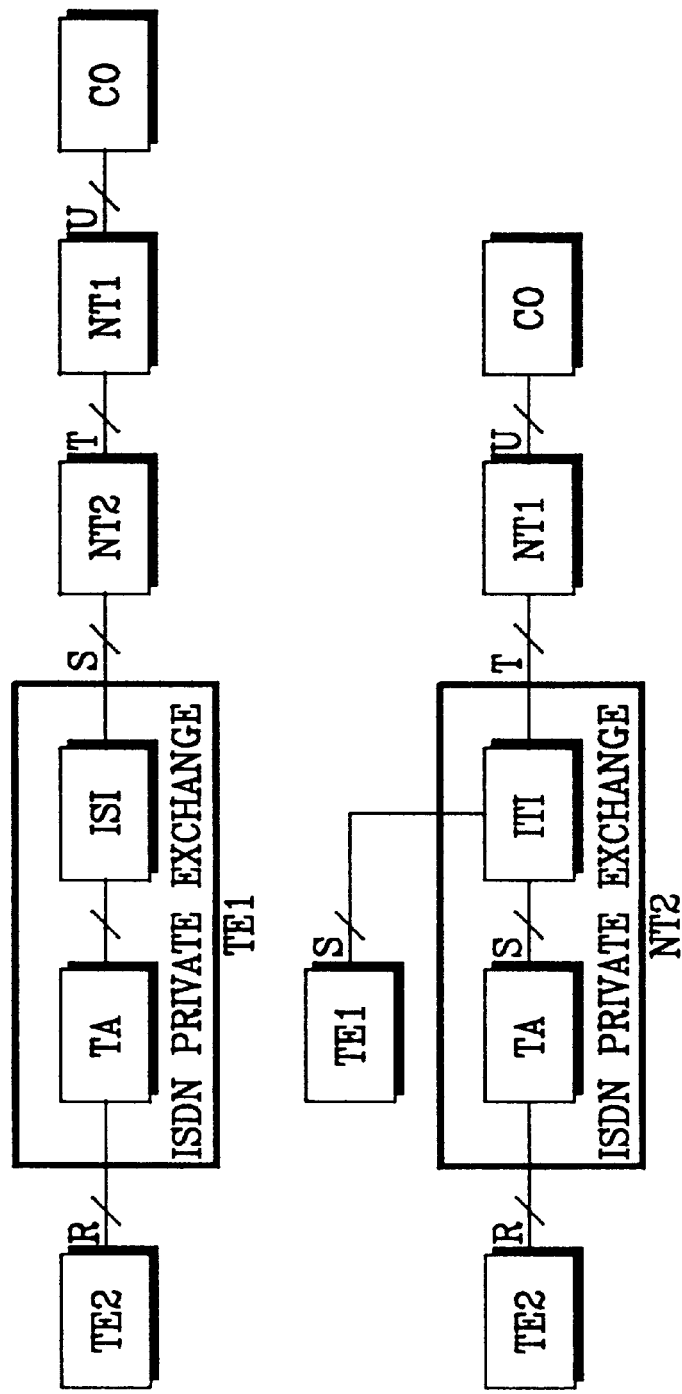
FIG. 1 is a block diagram of an interfacing relation between an ISDN user and a network.

Refer now to the drawings and, particularly to FIG. 1, which is a block diagram of an interfacing relation between an ISDN user and an ISDN. A private exchange can be recognized as an ISDN terminal in view of the network and as a network termination unit NT2 with a terminal adapt function and a switching function in view of the subscriber. In the preferred embodiment of the present invention, an ISDN interface function of a private exchange is implemented in accordance with CITT I.400 series network interface standards. The implementation of the ISDN interface function in the private exchange is generally classified into an ISDN protocol implementation and a call processing interface implementation.

On the basis of the OSI reference model, a communication system can be broken down into a hierarchial structure that permits standards to be defined at each level in the structure. The OSI reference model provides a hierarchy of seven different layers that can occur in a communication system. Each layer in the OSI reference model specifies a different function performed by the communication system. The lowest layer in the OSI reference model is known as a physical layer, which specifies the physical structure of interfaces in a particular communication system or network Thus, a standard for the physical layer of a communication system specifies such things as the actual cabling and connectors, their electrical characteristics, functional characteristics of signals transmitted over the wires, etc. The next layer in the OSI reference model is known as a data link layer which specifies how data is transmitted error free through the communication system. Thus, a standard for the second layer in the OSI reference model specifies how to detect errors in data transmissions passing over the physical layer, and how to correct any errors that may occur during transmission. The next higher layer in the OSI reference model is known as a network layer, which specifies the manner in which connections are formed between various places in the communication system for transmitting data between them. The standard for the third layer in the OSI reference model specifies the signals transmitted over the data link layer that cause the communication system to transfer data between two places on the network.

A recommendation by an International Telegraph and Telephone Consultative Committee ("CCITT") for ISDN an communication channel specifies the three lowest levels in the OSI reference model. Under the CCITT recommendation, a basic ISDN access consists of two full-duplex 64 kilobits per second ("kbps") digital data channels, known as B-channels., and another full-duplex 16-kbps digital data channel, known as a D-channel. Each B-channel is a basic user channel to carry either: (1) pulse code modulation ("PCM") encoded digital voice communication, (2) computer digital data, or (3) a mixture of lower data rate communication, including digital low data rate voice and lower data rate computer data. The D-channel serves two purposes. First, the D-channel carries signaling information that controls the transmission of data over the two B-channels. Second, when the D-channel is not carrying signaling information, it may be used to transmit packet switching or low-speed data connectivity to the network.

In FIG. 1, the network termination unit NTI provides the physical layer interface which is essentially equivalent to the physical layer of the OSI reference model. Network terminal unit NT2 can be broadly associated with the OSI physical layer, data link layer and network layer. TE1 is the terminal equipment and has an ISDN user-network interface. Terminal equipment covers functions broadly belonging to OSI physical layers and higher layers. Among this equipment are digital telephones, computer workstations, and other devices in the user end-equipment category. TE2 refers to equipment that does not meet ISDN terminal-network interface specifications and that requires interface modifications to adapt the equipment to ISDN. A terminal equipment adapter TA provides the necessary conversion functions to permit TE2 to interface with ISDN. Reference points U, T, S, and R are used to identify the interface available at those points. T and S are identical electrically, mechanically, and from the point of view of ISDN protocol. Point R relates to the TA interface or, in essence, it is the interface of that nonstandard, i.e., non-ISDN device.

On the basis of the OSI reference model, the relation between at call processing task and an ISDN protocol can be construed as the relation between a service user and a service provider. An interface is required between the service provider and service user, and a service can be defined according to service primitives which are conceptional interactions between the service user and provider. In other words, the implementation of a call processing interface is required for the conversion between call processing procedures of call processing tasks of the private exchange and call processing procedures of the ISDN because they are different from each other. Also, the service primitives must first be defined as service specifications for the implementation of ISDN protocol.

The following table 1 shows types and functions of services which the ISDN protocol as the service provider must provide to the call processing task as the service user.

TABLE 1

| SERVICE TYPES | PRIMITIVES | FUNCTIONS |
| --- | --- | --- |
| CALL | CC_CONN_RQ | REQUEST CALL CONNECTION |
| CONNECTION | CC_CONN_IN | INFORM OCCURRENCE OF INCOMING CALL |
| AND | CC_CONN_RS | RESPONSE TO INCOMING CALL |
| DISCONNECTION | CC_CONN_CO | CONFIRM CALL CONNECTION |
| | CC_CLEAR_RQ | REQUEST CALL DISCONNECTION |
| | CC_CLEAR_IN | INFORM CALL DISCONNECTION |
| | CC_CLEAR_RS | RESPONSE TO INFORMATION OF CALL DISCONNECTION |
| | CC_CLEAR_CO | CONFIRM CALL DISCONNECTION |
| CALL | CC_DIGIT_RQ | REQUEST TRANSMISSION INCOMING NUMBER IN SETTING CALL |
| CONNECTION | CC_DIGIT_CO | CONFIRM RECEPTION OF SUFFICIENT DIGITS |
| CONTROL | CC_INFO_CO | REQUEST INFORMATION TRANSMISSION TO CALL PROCESSING ENTITY |
| | CC_INFO_RQ | CONFIRM INFORMATION RECEPTION OF CALL PROCESSING ENTITY |
| | CC_PROGRESS_IN | INFORM CALL CONNECTION PROGRESS |
| | CC_ALERT_IND | INDICATE ALERT BASED ON INCOMING CALL |
| USER | CC_USER_INFO-RQ | REQUEST USER INFORMATION TRANSMISSION |
| INFORMATION | CC_USER_INFO_IN | INFORM USER INFORMATION RECEPTION |
| TRANSMISSION | | |
| CALL | CC_SUSPEND_RQ | REQUEST CALL SUSPENDING |
| REARRANGEMENT | CC_SUSPEND_CO | CONFIRM ACCEPTANCE OR WITHDRAWAL OF CALL SUSPENDING REQUEST |
| | CC_RESUME_RQ | REQUEST SUSPENDED CALL RESUMING |
| | CC_RESUME_CO | CONFIRM ACCEPTANCE OR WITHDRAWAL OF SUSPENDED CALL RESUMING REQUEST |
| INITIALIZATION | CC_INIT_RQ | REQUEST INITIALIZATION OF CALL PROCESSING ENTITY |
| AND | CC_INIT_CO | CONFIRM COMPLETION OF INITIALIZATTON OR CHANGE |
| CONFIGURATION | CC_SETPARA_RQ | REQUEST ENVIRONMENT SETTING OF CALL PROCESSING ENTITY |
| ENVIRONMENT | CC_SETPARA_CO | CONFIRM ENVIRONMENT SETTING OR COMPLETION OF CHANGE |
| SETTING | | |
| ADDITIONAL | CC_FACILITY_RQ | REQUEST USE OF ADDITIONAL SERVICES |
| SERVICES | CC_FACILITY_IN | INFORM REQUEST OF ADDITIONAL SERVICES |
| | CC_FACILITY_CO | CONFIRM USE OF ADDITIONAL SERVICES |
| | CC_TEST_RQ | REQUEST TEST OR ERROR DETECTION |
| | CC_TEST_CO | CONFIRM TEST OR ERROR DETECTION |
| | CC_CHARGE_IN | INFORM RECEPTION OF ACCOUNTING OR STATISTICAL INFORMATION |

In accordance with a preferred embodiment of the present invention, an ISDN private exchange is constructed in a multi-node distributed manner, where nodes can be interconnected up to eight at the maximum through an internode interface card to thus form a network structure. The respective nodes are constructed in a distributed control manner, where a control function of the exchange is distributed to microprocessors in the nodes so that a switching function can be performed by interactions among them. Each node can be equipped with subscriber shelves of up to eight at the maximum. Each subscriber shelf includes a universal card slot UCS for containing user/network interface (called S/T reference point) cards of up to sixteen at the maximum, respectively. In each subscriber shelf, a line processing module (LPM) is adapted to control the interface cards. Each subscriber interface card can accommodate subscribers of up to sixteen at the maximum. Each ISDN interface card can accommodate an ISDN terminal in the exchange or interfaces the exchange to an ISDN public network. In other words, the ISDN interface card is connected to the ISDN public network in response to requests from voice and data terminal to enable voice and data communications.

Figure 2:
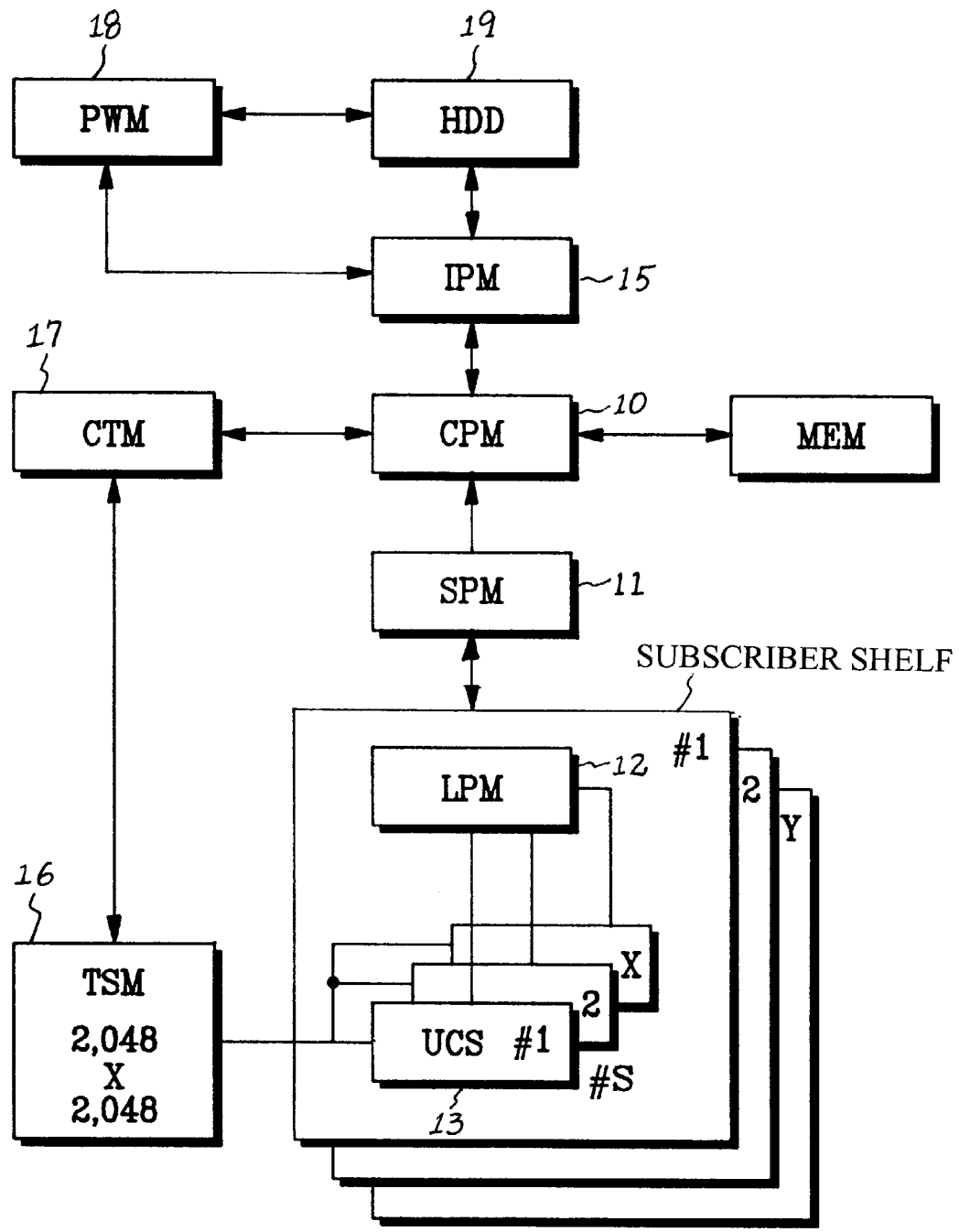
FIG. 2 is a block diagram of an ISDN private exchange constructed according to the principles of the present invention.

Refer now to FIG. 2 which is a block diagram of an ISDN private exchange constructed according to the principles of the present invention. The ISDN private exchange includes a central processing module CPM 10, a signal processing module 11, a line processing module 12, a universal card slot UCS 13, a memory module MEM 14, an input/output (I/O) processing module IPM 15, a time switch module TSM 16, a clock tone module CTM 17, a power module PWM 18, and a hard disk drive HDD 19.

A central processing module CPM 10 is adapted to store a main exchange control program therein and controls the entire system according to the stored program. Thus, the central processing module CPM 10 performs voice call processing, data call processing, system configuring, diagnostic, monitoring, statistical and signal processing functions. Also, the central processing module CPM 10 includes a common memory for exchanging messages with other modules to control another module. The common memory may preferably be a dual port random access memory (RAM).

A line processing module LPM 12 is disposed in each subscriber shelf to monitor which event occurs in each subscriber card and to detect the associated information. The line processing module LPM 12 also performs an operation corresponding to command a from the central processing module CPM 10.

A signal processing module SPM 11 is adapted to control the eight line processing modules LPM 12 of the subscriber shelves #1 to Y and to relay message communications between the central processing module CPM 10 and the line processing modules LPM 12. In other words, the signal processing module SPM 11 exchanges a message with each line processing module LPM 12 through a signaling link of 512-kbps at the maximum. Also, the signal processing module SPM 11 exchanges a message with the central processing module CPM 10 through the common memory.

A memory module MEM 14 is disposed in a control shelf to act as a main memory for storing a system program and data therein. The memory module MEM 14 may preferably include a dynamic random access memory (DRAM) with a 16-megabyte capacity. Also, the memory module MEM 14 allows error detection and correction functions to enhance the reliability of system.

An input/output (I/O) processing module IPM 15 is disposed in the control shelf to perform an input/output control function for controlling eight input/output ports. The I/O processing module IPM 15 also connects the central processing module CPM 10 to a hard disk drive HDD 19 for the storage of a system program and data.

A time switch module TSM 16 may preferably be provided with a T-switch including 2048×2048 time slots. The time switch module TSM 16 is adapted to provide nonblocking service.

A clock tone module CTM 17 is adapted to provide a system clock for synchronization between the private exchange and the ISDN network. The clock tone module CTM 17 also provides a system tone source and performs conference and common resource test functions.

A power module PWM 18 is divided into a main power supply unit and an input/output power supply unit. The main power supply unit is adapted to supply power to the entire system, and the input/output power supply unit is adapted to supply power to the I/O processing module IPM 15 and hard disk drive HDD 19, respectively.

Each universal card slot UCS 13 contains a subscriber interface card for accommodating subscribers, and a network interface card for connecting the private exchange to the ISDN public network. The subscriber interface card and the network interface card are adapted in the UCS of the line processing module LPM 12 and finder control of the line processing module LPM 12. The subscriber interface card and the network interface card are determined as to type according to the types of subscribers and networks which are connected to the exchange. In other words, the subscriber interface card may be an analog line interface card (ALI) for accommodating analog telephones, a digital line interface card (DLI) for accommodating digital telephones, a data communication interface card (DCI) for accommodating data termination units such as a terminal, a personal computer (PC) and a printer, or an ISDN subscriber interface card (ISI) for accommodating ISDN terminals. The network interface card may be a T1/E1 interface card (T1/E1) for connecting the exchange to the public telephone network and an ISDN interface card (INI) for connecting the T1/E1 interface card to the ISDN public network. Further, an internode interface card (INI) may be provided to perform communication between the nodes in the ISDN private exchange with the multinode distributed architecture.

On the other hand, the reference numeral #Z designates the maximum number of extensible nodes, which may be eight in the preferred embodiment of the present invention. The reference numeral #Y designates the maximum number of subscriber shelves per node, which may be eight in the preferred embodiment of the present invention. The reference numeral #X designates the maximum number of mountable cards per subscriber shelf, which may be sixteen in the preferred embodiment of the present invention. The reference numeral #S designates the maximum number of supportable subscribers per card, which may be sixteen in the preferred embodiment of the present invention.

Figure 3:
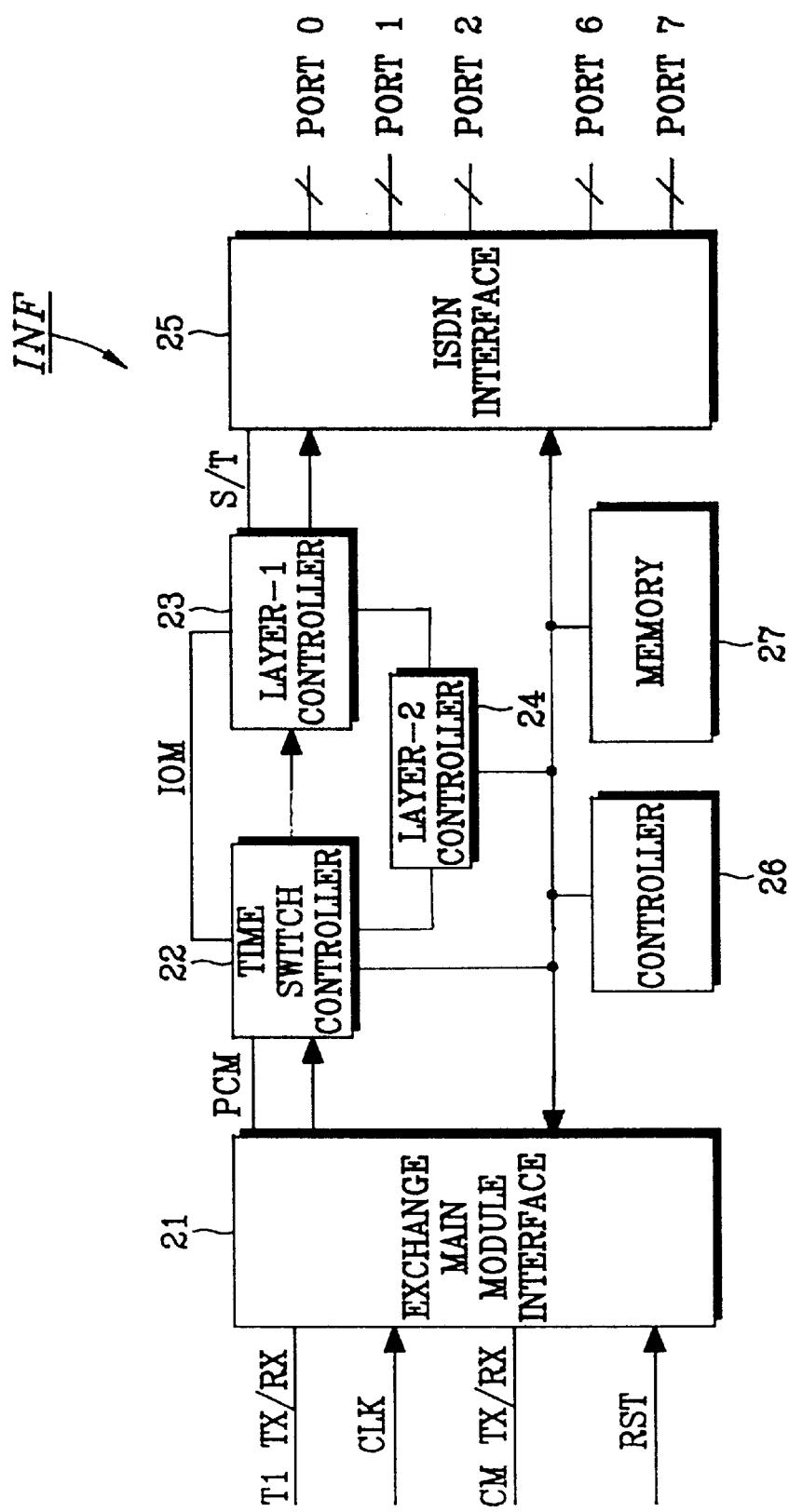
FIG. 3 is a block diagram of a private exchange/ISDN interface apparatus constructed in accordance with an embodiment of the present invention.

FIG. 3 is a block diagram illustrating the construction of a private exchange/ISDN interface apparatus in accordance with an embodiment of the present invention, implemented to satisfy the above-mentioned service requirements. In accordance with the preferred embodiment of the present invention, the private exchange/ISDN interface apparatus is disposed in the subscriber shelf of the private exchange in the form of a network card as mentioned above. The private exchange/ISDN interface apparatus exchanges signaling information of the exchange through the common memory (dual port RAM) and converts the signaling information into ISDN signaling information to establish a call according to an ISDN call processing procedure. Ultimately, a speech path is formed between B-channels of the private exchange/ISDN interface apparatus to enable transmission and reception of user information (for example, voice).

In FIG. 3, a controller (control ASIC) 26 is adapted to control the entire private exchange/ISDN interface operation. The controller 26 includes a common memory and an interrupt controller for communication with the central processing module CPM 10 as shown in FIG. 2. A memory 27 is provided with a read-only-memory ROM (128 Kbytes) and a random-access-memory RAM (128 Kbytes) for storing call processing interface and ISDN protocol programs for the connection of the private exchange to the ISDN public network. An exchange main module interface (T1:T1 digital trunk interface card)21 is adapted to perform an interfacing operation with the central processing module CPM 10 (or line processing module LPM 12 ) as shown in FIG. 2. The exchange main module interface 21 exchanges signaling information with the central processing module CPM 10 through the common memory. In addition, the exchange main module interface 21 receives a clock signal from the central processing module CPM and is connected to twenty-four 64 Kbps B-channels for the establishment of a speech path. As a result, the exchange main module interface 21 has a transmission rate of 1.544 Mbps. An ISDN interface (BRI: basic rate interface) 25 is adapted to perform an interfacing operation between the private exchange and the ISDN. The ISDN interface 25 can accommodate ISDN connection terminals up to four. Each user/network interface card is in the form of 2B+D consisting of two 64 Kbps D-channels and has a transmission rate of 192 Kbps. Then, two separated pairs (four wires) of transmission/reception twisted wires are used to form a line. A layer-2 controller (IDEC: ISDN D-channel exchange controller) 24 is adapted to control four D-channels at a time. Namely, the layer-2 controller 24 receives a link access procedure on the D-channel ("LAPD") frame from a physical layer, and transmits the received LAPD frame to a D-channel of the associated port. Also, the layer-2 controller 24 reads D-channel data received at each port, produces an LAPD frame on the basis of the read data, and delivers the produced LAPD frame to the physical layer. For communication with the physical layer, a first-in-first-out ("FIFO") memory is assigned with 64 bytes for transmission/reception per D-channel. At this time, transmission and reception requests are made by interrupting. A layer-1 controller (QUAT-S: quadruple transceiver for user/network interfaces) 23 is adapted to perform the reciprocal conversion between a user/network interface frame structure and an ISDN oriented modular ("IOM") interface frame structure because they are different from each other. The IOM may preferably be Model ISM2 available from SIEMENS company.

A time switch controller (EPIC: extended PCM interface controller) 22 is adapted to control speech path connections between eight B-channels of the ISI)N interface 25 and eight B-channels of the exchange main module interface 21. Also, the time switch controller 22 performs the reciprocal conversion between a pulse code modulation (PCM) interface frame structure and the IOM interface frame structure because they are different from each other.

Figure 4:
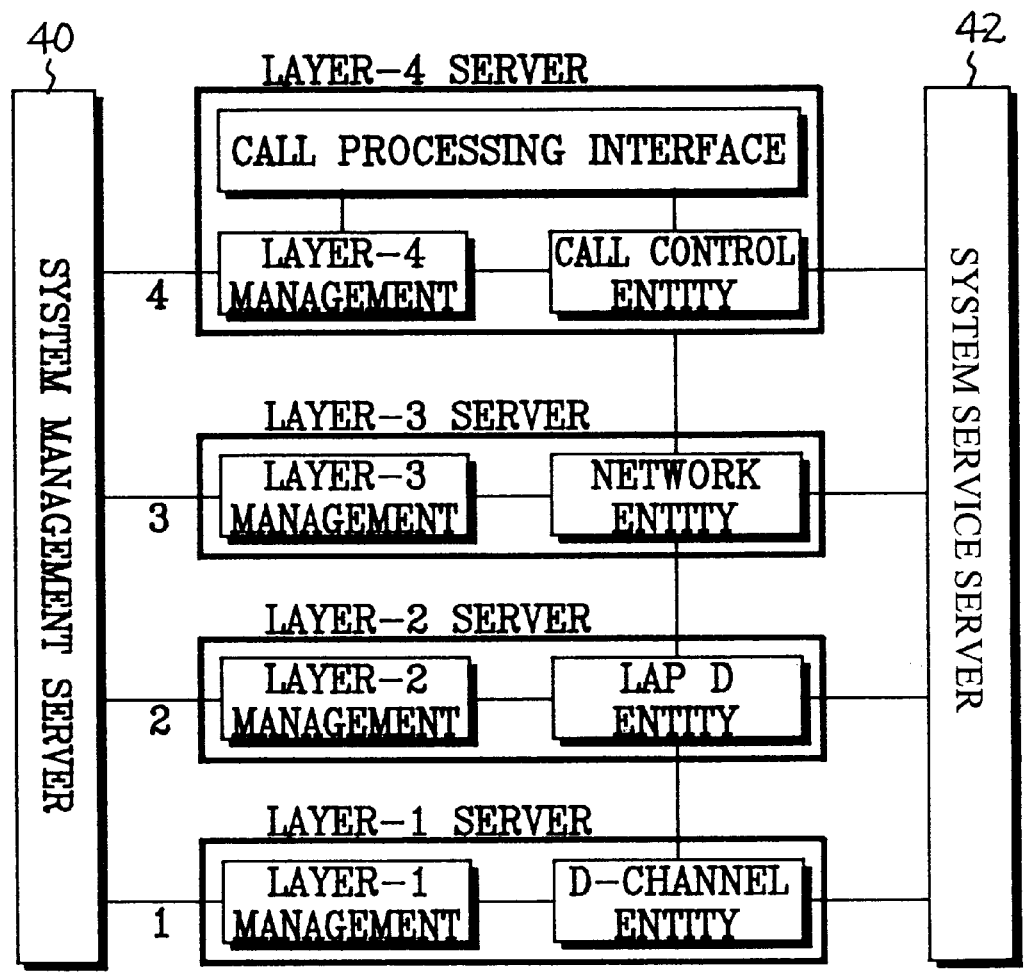
FIG. 4 is a block diagram of a software configuration for operating the private exchange/ISDN interface apparatus according to the principles of the present invention.

FIG. 4 is a block diagram illustrating the configuration of a software for operating the private exchange/ISDN interface apparatus as shown in FIG. 3 in accordance with the embodiment of the present invention. In accordance with the preferred embodiment of the present invention, the software is implemented on the basis of the OSI reference model.

As shown in FIG. 4, the software comprises a system management server 40, a system service server 42, and a plurality of layers, each of which includes a layer server, entities and internal and external FIFO queues for communication between the entities. In each layer, a plurality of entities are interconnected to form the layer server. The entities are classified into a software entity (for example, a functional module) and a hardware entity (for example, a microprocessor). The layer server corresponds to a task or process for the management of a service of each layer.

In more detail, a layer-1 server is provided with a layer-1 management entity, a D-channel entity, a B-channel entity and an ISDN interface. The layer-1 management entity performs layer-1 initialization and configuration, network access, management, network connection activation and deactivation, and D-channel management. The D-channel entity performs D-channel activation and deactivation, and transmission and reception of an LAPD frame through a D-channel. The B-channel entity performs B-channel activation and deactivation, and transmission and reception of a link access procedure on the B-channel ("LAPB") frame through a B-channel. The ISDN interface performs a physical interface function of accommodating an ISDN terminal in the private exchange or connecting the private exchange to the ISDN public network.

A layer-2 server is provided with a layer-2 management entity, an LAPD entity and an LAPB entity. The layer-2 management entity performs layer-2 initialization and configuration, data transmission and reception, terminal endpoint identifier (TEI) management, error report, resource management and connection management. The LAPD entity performs D-channel setting and release, transmission and reception of data through a D-channel, and D-channel flow and error controls. The LAPB entity performs B-channel setting and release, transmission and reception of data through a B-channel, and B-channel flow and error controls.

A layer-3 server is provided with a layer-3 management entity, a network entity and an X.25 entity. The layer-3 management entity performs layer-3 initialization and configuration, and error and status reports. The network entity performs call setting and release, call control and rearrangement, and user data transmission. The X.25 entity performs an X.25 packet protocol such as data call setting and release, user packet transmission, etc.

A layer-4 server is provided with a layer-4 management entity, a call control entity, a PAD entity and a call processing interface. The layer-4 management entity performs layer-4 initialization and configuration, and error and status reports. The call control entity performs an upper layer function of a D-channel signaling protocol and a function of interfacing between a voice call processing task and the ISDN protocol. The PAD entity performs an OSI layer-4 protocol and a function of interfacing between a data call processing task and the ISDN protocol. The call processing interface performs a function of interfacing with the exchange main module. In other words, the call processing interface performs the reciprocal conversion between a control message based on the existing call processing procedure and a control message based on the ISDN call processing procedure.

The system management server 40 is adapted to manage all of the layers in the system. Namely, the system management server 40 performs entity initialization and configuration, entity activation and deactivation, system resource management, system parameter change and statistical data management.

The system service server 42 is a real-time operating system for supporting functions such as memory management, timer management, intertask communication, interrupt process, etc.

On the other hand, if a subscriber requests conversation or communication through a voice or data terminal, the subscriber interface card detects such a request and initiates a voice or data call processing task for such request in the central processing module CPM 10 shown in FIG. 2. Then, the corresponding call processing task controls the ISDN interface card to converse or communicate with the other terminal through the ISDN public network. At this time, the private exchange/ISDN interface apparatus exchanges signaling information with the central processing module CPM 10 in the private exchange through the common memory and converts a signaling manner of the central processing module CPM 10 into an ISDN signaling manner. The signaling manner is a protocol which is mainly used for call control, such as call connection or disconnection, between exchanges, such as a user exchange connected directly with the user and a trunk exchange in the network. The ISDN employs a common signaling mode, which transmits a call control signal and a conversation signal using separate lines. A user/network signaling mode of the ISDN private exchange is implemented according to a I.400 series recommendation of CCITT, a network/network signaling mode is implemented according to a I.500 series recommendation of CCITT, and an in-network signaling mode is implemented according to a I.700 series No. 7 recommendation of CCITT.

Figure 5:
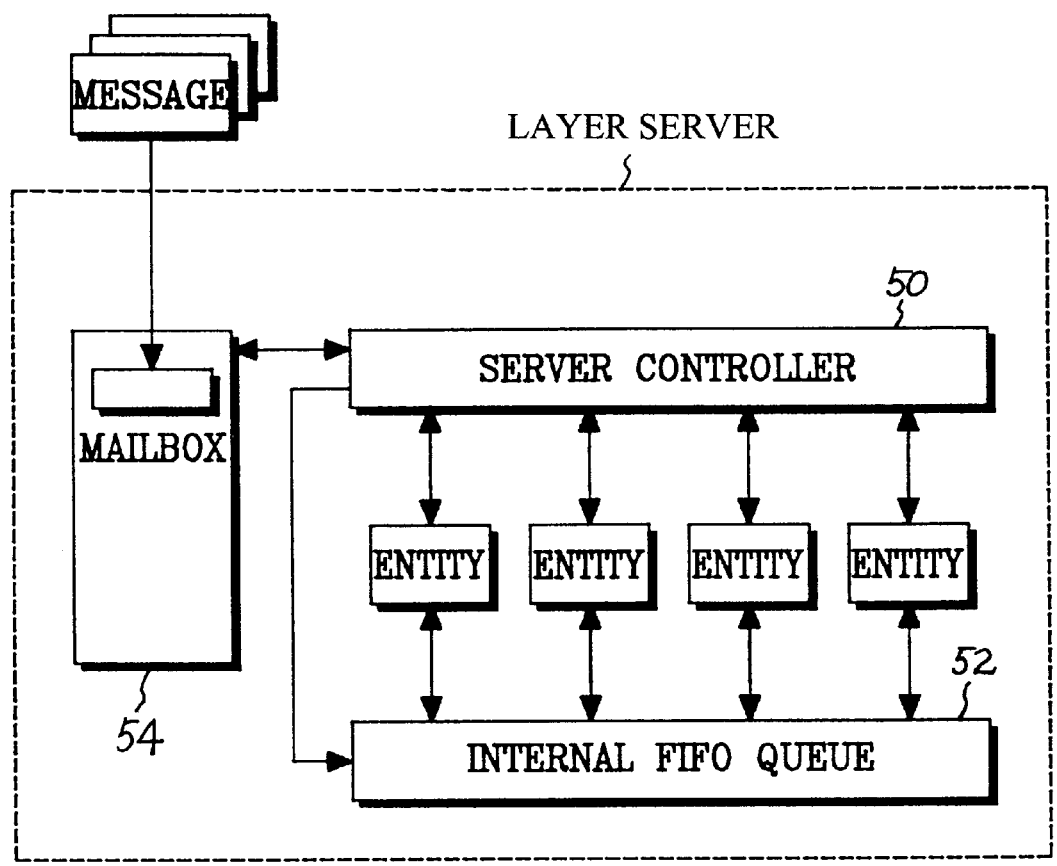
FIG. 5 is a block diagram of the construction of each layer server as shown in FIG. 4.

FIG. 5 is a block diagram illustrating the construction of each layer server in FIG. 4. Each layer server is one independent task including a server controller 50, an internal FIFO queue 52, an external FIFO queue known as a mailbox 54, and a plurality of entities, and performs a unique function recommended by CCITT I.400 series network interface standards. The entities are functional modules for performing defined layer functions. The ISDN interface function is performed by interactions between the interlayer entities and between the intralayer entities. The interactions between the interlayer entities are communicated through an external FIFO queue (mailbox) 54, and the interactions between the intralayer entities are communicated through an internal FIFO queue 52. An address of a specific entity for message communication is provided with an identifier (mailbox ID) of the external FIFO queue (mailbox) 54 of the corresponding layer server and an entity identifier.

Figure 6:
FIG. 6 illustrates a format of a communication message between entities in accordance with the embodiment of the present invention.

FIG. 6 illustrates a format of a communication message between the entities in accordance with the embodiment of the present invention. As shown in this drawing, the communication message between the entities includes a transmission entity identifier, a reception entity identifier, a network access indicator, a service access point indicator, a connection identifier, a primitive code, a priority, a message retain/release control flag, an address of the next message registered in a queue, an address of the prior message registered in the queue, an address of an area for service provision, a start offset of message contents, a size of message contents, an address of message contents by the primitive code, a start offset of message segment in a buffer, a size of message segment in the buffer, a start address of a first buffer, and message contents.

In the case where an arbitrary entity is to request a service from a particular entity, it first writes transmission and reception entity identifiers and a primitive code of the requested service in a head of a message to be sent and then requests the operating system to send the message (os_send_msg(*p_msg)). The operating system 42 as shown in FIG. 4 compares the transmission and reception entity identifiers in the message to determine whether the present message communication is intralayer entity communication or interlayer entity communication. In the case where the present message communication is intralayer entity communication, the operating system 42 registers the message in an internal FIFO queue 52 of the corresponding layer server as shown in FIG. 5. However, if the present message communication is interlayer entity communication, the operating system 42 finds a mailbox 54 of a reception server including the particular entity (reception entity) and registers the message in the found mailbox 54. If the message sending is completed, the operating system 42 transfers the control operation to a dispatch routine thereof. Then, the control operation is transferred to the reception server by a task scheduling of the operating system 42, thereby causing a main of the reception server to be driven. The layer server main reads the message from the mailbox 54 thereof and registers the read message in an internal FIFO queue 52 thereof. Then, the reception server reads the message from the internal FIFO queue 52 and jumps to a functional module corresponding to the reception entity identifier in the read message. The corresponding functional module performs the service requested according to the service primitive code in the message and then transfers the control operation to the server main. The server main reads the subsequent messages from the internal FIFO queue and repeats the same procedure continuously until no further message is present in the internal FIFO queue 52. If no further message to be processed is present in the internal FIFO queue, the reception server transfers the control operation to the dispatch routine of the operating system 42.

Figure 7:
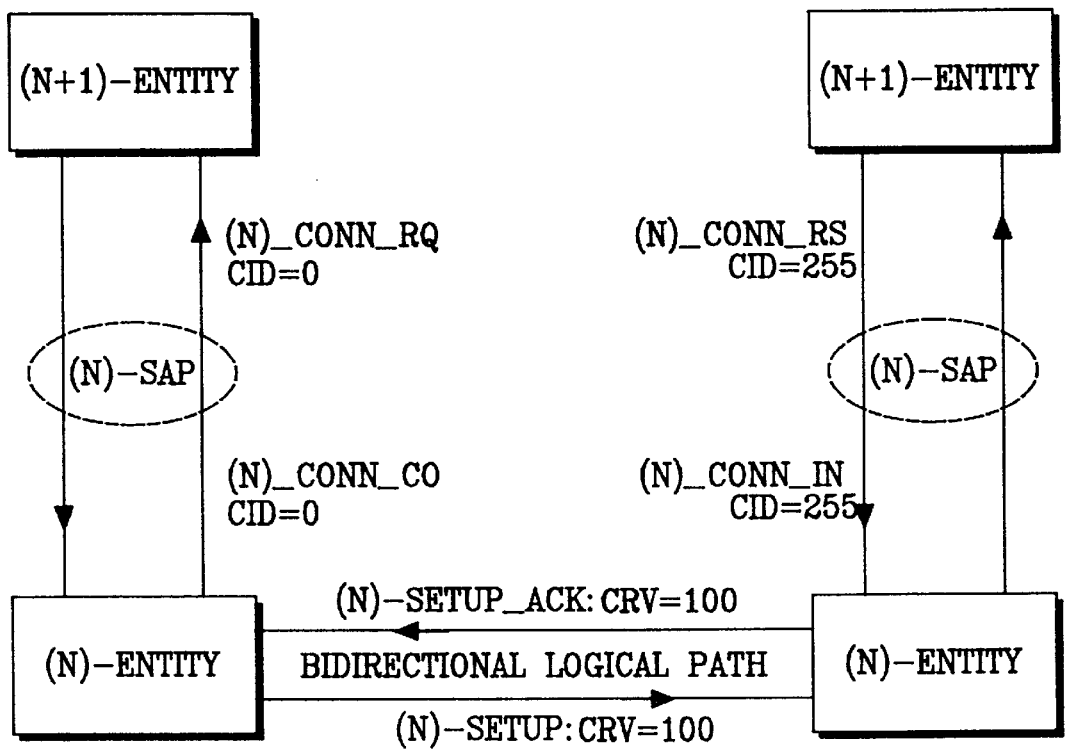
FIG. 7 is a block diagram of an ISDN protocol in accordance with the embodiment of the present invention.

FIG. 7 is a block diagram illustrating the ISDN protocol in accordance with the embodiment of the present invention. The ISDN protocol has a layered architecture based on the OSI reference model, where the relation between two adjacent layers can be construed as is the relation between service user and service provider. The upper and lower layers request or provide a service through an interlayer interface. Each layer has a complex configuration in, which, in order to provide a service requested by the upper layer, it requests the associated service from the lower layer. Such a configuration can be abstracted by a peer-to-peer protocol of each layer. In other words, in the ISDN protocol, if an upper layer requests a service, the service provision can readily be modeled by an interaction between layers of the same level based on the peer-to-peer protocol.

End-to-end communication between (N+1)-entities is ultimately performed along a bidirectional logical path which is established according to an (N)-protocol of an (N)-entity. Because a plurality of bidirectional logical paths may be present simultaneously for the communication between (N+1)-entities, identifiers are required for the discrimination among them. In order to meet requirements of a layered architecture allowing the (N+1)-entity to be operable even without recognizing implemented details of the (N)-entity, the logical path identifiers must be classified into an identifier (service identifier) on an (N+1)/N interface and an identifier (peer-to-peer identifier) on the peer-to-peer protocol. A mapping table is required to define a correspondence between the service identifier and peer-to-peer identifier for the establishment of one logical path. The service identifier is a connection identifier between the (N+1)-entity and (N)-entity. In the case of (N)_CONN_RQ, the service identifier is determined by the (N+1)-entity and transferred to the(N)-entity. If(N)_CONN_IN, the service identifier is determined by the (N)-entity and transferred to the (N+1)-entity. The service identifier is specified in the increased direction (0→126) in the case of (N)_CONN_RQ and in the reduced direction (255→128) in the case of (N)_CONN_IN. The service identifier 127 is used for a broadcast communication path for layer management. The peer-to-peer identifier is a connection identifier between the (N)-entities. In the case of (N)_CONN_RQ, the peer-to-peer identifier is determined by the (N)-protocol and placed in an (N)-setup protocol message to be transferred to the (N)-entity of the same level. As a result, the (N)-entities of the same level on one logical path have the same peer-to-peer identifier for the identification thereof.

On the other hand, according to the OSI reference model, the relation between two adjacent layers can be construed as the relation between service user and provider. Also, the adjacent upper and lower layers to each layer are conceptually the same. In this connection, a layer-3 protocol will hereinafter be described in detail in accordance with the embodiment of the present invention.

As mentioned above, if the layer-3 server is operated by the task scheduling of the operating system 42 in the interentity communication, it first reads a message from a mailbox 54 thereof and registers the read message in an internal FIFO queue 52 thereof. Then, the layer-3 server analyzes the message registered in the internal FIFO queue 52. If the received message is an initialization request message sent from the system management server 40 as a result of the analysis, the layer-3 server initializes itself. Thereafter, the layer-3 server jumps to an entity corresponding to one message read from the internal FIFO queue 52. After the corresponding entity is completed in operation, the layer-3 server repeats the above procedure continuously until no further message is present in the internal FIFO queue 51. The processing procedure can schematically be expressed as in the following table 2, where a C language may be used.

TABLE 2

L3_Server_Main ()
{
    Read message from self-mailbox and register it in internal FIFO queue.

If (received message == initialization request message), initialize layer-3 server.

While (internal FIFO queue !=NOT EMPTY) {
    Read one message from internal FIFO queue.
    Check reception entity identifier in message.
    Jump to corresponding entity with received message pointer.
    }
}

In the above table 2, the "received message pointer" the checked reception entity identifier.

The layer-3 management entity performs the layer-3 initialization and configuration. Namely, the layer-3 management entity performs allocation and initialization of resources to be used in the layer-3. Upon system booting, the system management server 40 as shown in FIG. 4 applies an initialization command SM_SET_CONFIG_RQ to the layer-3 management entity for the layer-3 initialization and configuration. In response to the initialization command from the system management server 40, the layer-3 management entity performs the allocation and initialization of resources for the management of the layer-3 and applies an initialization command MNS_SET_CONFIG_RQ to the network entity. In response to the initialization command from the layer-3 management entity, the network entity allocates a network control buffer for network connection management to each user/network interface port. Also, the network entity allocates the same number of call control buffers as the maximum number of simultaneously processable calls to each network control buffer. Further, the network entity allocates a broadcast link control buffer and a signaling link control buffer to each network control buffer. After allocating the resources or buffers for the network control, call control and link control, the network entity completes the initialization of the control buffers and sends initialization confirm information MNS_SET_CONFIG_CO to the layer-3 management entity. Upon receipt of the initialization confirm information from the network entity, the layer-3 management entity sends initialization confirm information SM_SET_CONFIG_CO indicative of the completion of the layer-3 initialization and configuration to the system management server. In this manner, the establishment of an environment in which the layer-3 entities can normally be operated is completed.

Figure 8:
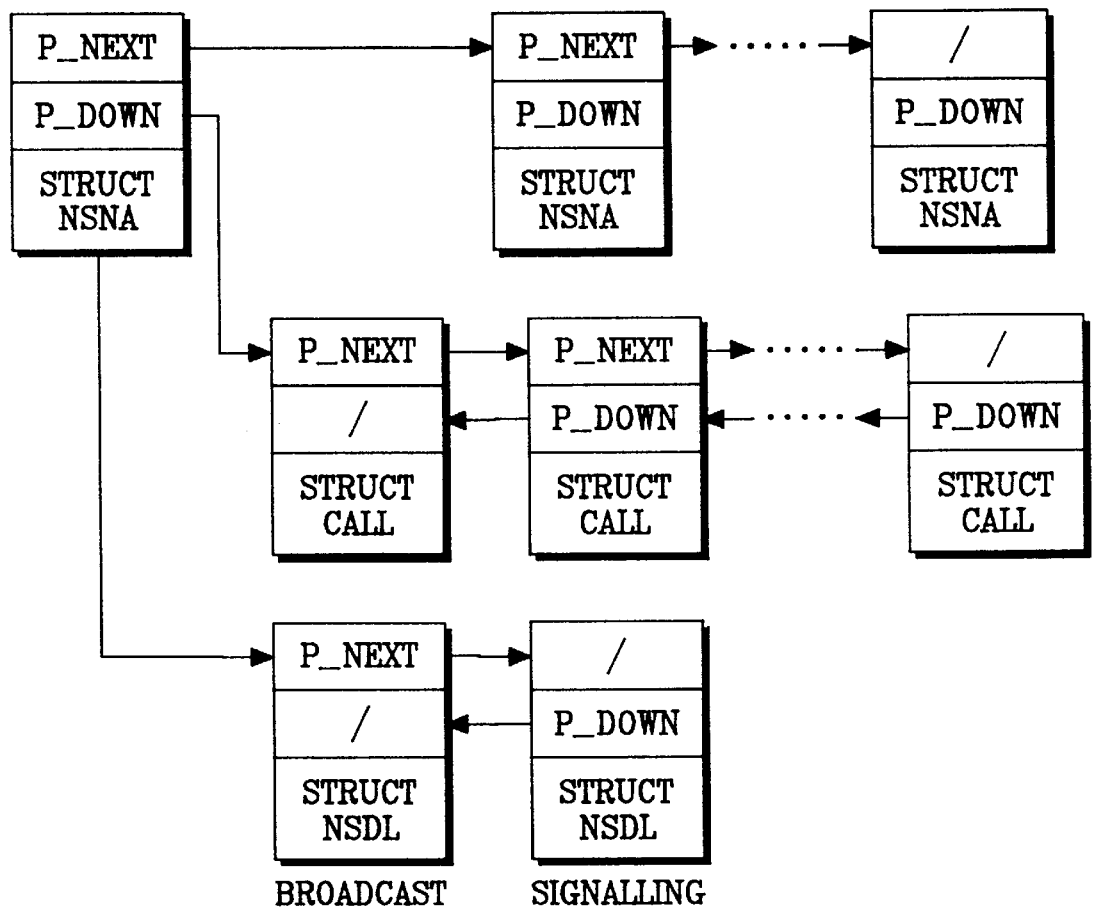
FIG. 8 is a block diagram of the construction of network, call and link control buffers in accordance with the embodiment of the present invention.

FIG. 8 is a block diagram illustrating the construction of the network, call and link control buffers in accordance with the embodiment of the present invention, where "p_xxxx" signifies a pointer.

Input messages to the network entity can generally be classified into an outgoing call control message from the call control entity of the layer-4, an incoming call control message from the LAPD entity of the layer-2, a timer message from the system service server 42 as shown in FIG. 4, and an initialization message from the layer-3 management entity. The network entity performs processes corresponding to primitive codes in the input messages. The processing procedure can schematically be expressed as in the following table 3.

TABLE 3

L3_Network_Entity (*p_imsg)
{
    Store input messages in message buffer.
    Read message identifiers in input messages.

Switch (primitive codes) {
        layer-4 message: operate layer-4 message processor.
            drive finite status machine.
            break;
        layer-2 message: operate layer-2 message processor.
            drive finite status machine.
            break;
        timer message: operate timer message processor.
            drive finite status machine.
            break;
        initialization message: operate initialization message processor.
            break;

TABLE 3-continued other messages: operate error message processor.
            drive finite status machine.
    }

Transfer control operation to L3 server main.
}

In the above processing procedure, if the input message is the outgoing call control message (layer-4 message) from the call control entity of the layer-4, the layer-4 message processor first retrieves a message size, a network access indicator NAI, a service access point indicator SAPI, a connection identifier CONN_ID, etc. in the input message to check a validity of the input message. If the layer-4 message is an initial outgoing call connection request message (initial NS_CONN_RQ), the layer-4 message processor allocates a new call control buffer. Then, the layer-4 message processor specifies a call reference number, stores the connection identifier and the specified call reference number in the allocated call control buffer and drives a program (status machine) which accommodates a status transition disclosed in SDL of I.451 of CCITT recommendation, as it is. Provided that the layer-4 message is a different message, the layer-4 message processor first retrieves the network access indicator, service access point indicator and connection identifier in the layer-4 message to find the corresponding call control buffer. After finding the corresponding call control buffer, the layer-4 message processor drives the status machine.

If the input message is the incoming call control message (layer-2 message) from the LAPD entity of the layer-2, the layer-2 message processor first checks a validity of the input message similarly to the above. In the case where the layer-2 message is an initial incoming call connection request message (initial NS_CONN_IN), the layer-2 message processor allocates a new call control buffer. Then, the layer-2 message processor specifies a connection identifier, stores the specified connection identifier and a call reference number in the allocated call control buffer and drives the status machine. If the layer-2 message is a different message, the layer-2 message processor first retrieves a network access indicator, a service access point indicator and a call reference number to find the corresponding call control buffer. After finding the corresponding call control buffer, the layer-2 message processor drives the status machine.

In the case where the input message is the timer message from the system service server, a timer message processor first checks a validity of the input message. Then, the timer message processor retrieves a network access indicator, a service access point indicator and a call reference number to find the corresponding call control buffer. After finding the corresponding call control buffer, the timer message processor drives the status machine.

In the case where the input message is an initialization message from the layer-3 management entity, the initialization message processor performs the allocation and initialization of resources for the layer-3 control as mentioned above with respect to the layer-3 management entity.

Next, the call processing interface will be described in detail as follows.

The call processing interface functions to perform an interfacing operation between the central processing module CPM of the private exchange and the ISDN interface card in the subscriber shelf of the private exchange. In more detail, the call processing interface acts as a service access point for performing an interfacing operation between a call processing task of the central processing module CPM and a call control entity of the ISDN interface card to allow the call processing task to request and receive various ISDN services. The call processing interface exchanges signaling information with the central processingmodule CPM 10 of the private exchange through the common memory and performs reciprocal conversion between a signaling mode of the central processing module CPM 10 and an ISDN D-channel signaling mode. Further, the call processing interface performs message disassembly and segment assembly functions for the message transmission and reception with the central processing module CPM 10.

Figure 9:
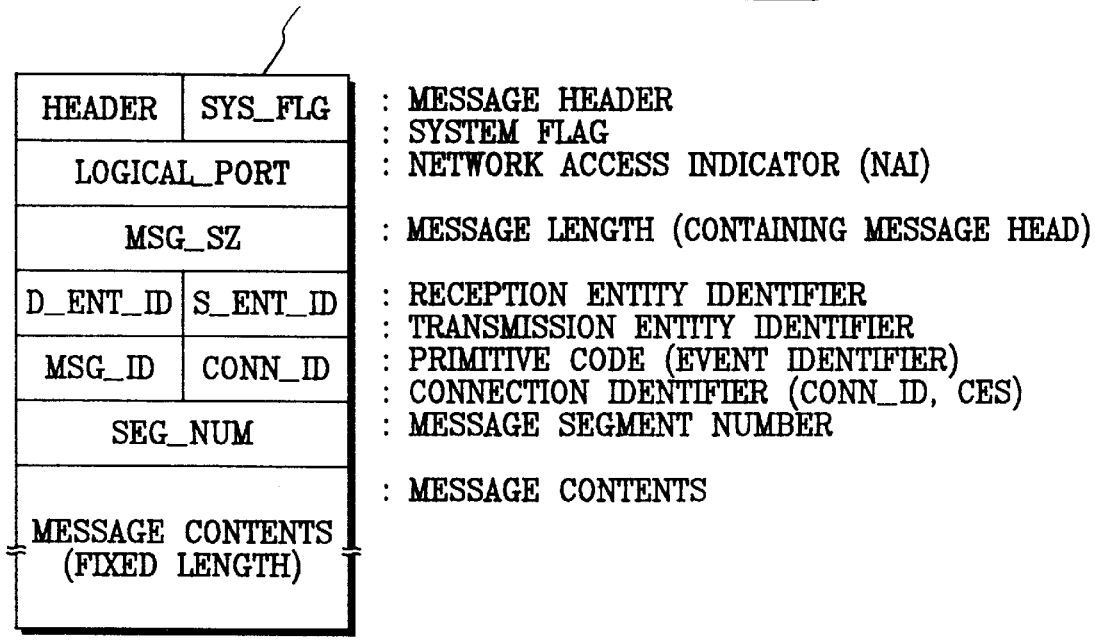
FIG. 9 illustrates a format of a communication message between a central processing module of the private exchange and an ISDN interface card in a subscriber shelf of the private exchange in accordance with the embodiment of the present invention.

FIG. 9 illustrates a format of a communication message between the central processing module CPM 10 of the private exchange, as shown in FIG. 2, and the ISDN interface card in the subscriber shelf of the private exchange as shown in FIG. 3, in accordance with the embodiment of the present invention. As shown in FIG. 9, the communication message between the central processing module CPM 10 and the ISDN interface card includes a message header, a system flag, a network access indicator, a message length, a reception entity identifier, a transmission entity identifier, a primitive code, a connection identifier, a message segment number and message contents.

Figure 10:
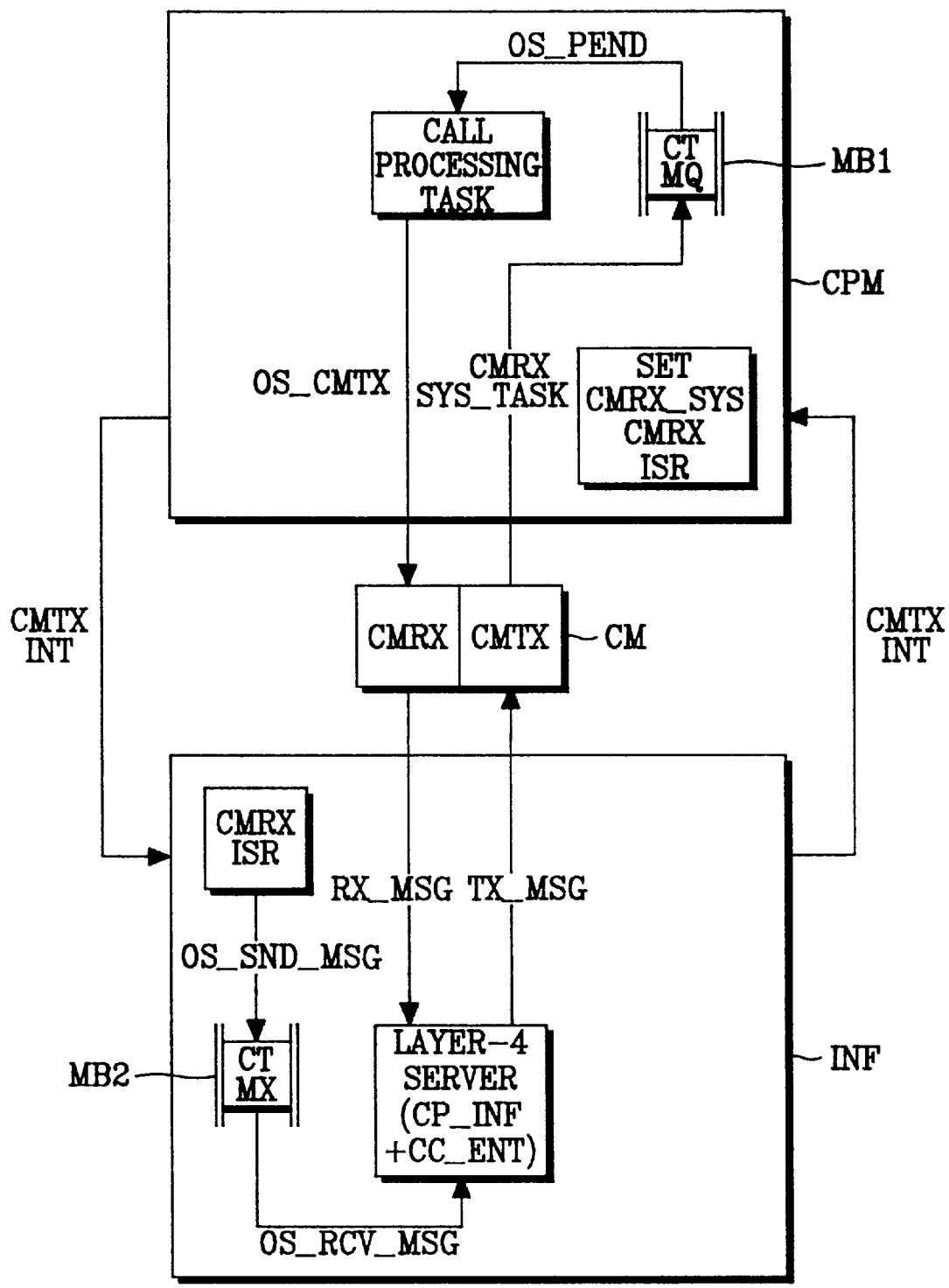
FIG. 10 is a block diagram of a procedure of transmitting and receiving signaling information between the central processing module of the private exchange and the ISDN interface card in the subscriber shelf of the private exchange in accordance with the embodiment of the present invention.

FIG. 10 is a block diagram illustrating procedures of transmitting and receiving signaling information between the central processing module CPM 10 of the private exchange, as shown in FIG. 2, and the ISDN interface card INF in the subscriber shelf of the private exchange, as shown in FIG. 3, in accordance with the embodiment of the present invention.

First, a central processing module reception interface function will be described hereinbelow.

The reception interface function is to convert a call processing message from the central processing module CPM 10 received by the common memory CM into an ISDN call control message and transfer the converted ISDN call control message to the call control entity. The detailed procedure is as follows:

1) The call processing task of the central processing module CPM 10 writes a call processing message in a reception area of the common memory CM to send the call processing message to the layer-4 server of the ISDN interface card INF as shown in FIG. 3. At this time, if the call processing message to be sent is larger than a message block of the common memory CM, the call processing task disassembles the message into segments, appends series numbers to the disassembled segments, respectively, and end-marks the last segment. Then, the call processing task writes the segments sequentially one by one in the unit of message block.

Then, the call processing task of the central processing module CPM generates a common memory transmission (CMTX) interrupt CMTX INT to the ISDN interface card INF.

2) If the call processing task of the central processing module CPM generates the common memory transmission interrupt CMTX INT to the ISDN interface card INF, a common memory reception (CMRX) interrupt service routine is driven. The interrupt service routine produces a request message to request the message reception from the common memory CM and registers the produced request message in the mailbox of the layer-4 server to send it to the call processing interface entity. At this time, the message sending is performed by using the above-mentioned interentity communication mechanism.

3) Under the control of the task scheduling of the operating system, the layer-4 server of the ISDN interface card INF reads the registered message from the mailbox thereof and transfers the read message to the call processing interface entity.

4) The call processing interface entity checks a primitive code of the received message. If the received message is to request the message reception from the common memory CM, the call processing entity reads the message written in the reception area of the common memory CM and stores the read message in its message buffer. In the case where the segment number of the read message is not the end mark, the call processing entity assembles the segments into one message.

5) The call processing interface entity converts the call processing message from the central processing module CPM 10 into the corresponding ISDN- call control message and transfers the converted ISDN call control message to the call control entity. As a result, the reception interface function is completed.

Next, a central processing module transmission interface function will be described.

The transmission interface function is to convert an ISDN call the call control entity into a call processing message of the central processing module CPM 10 and transfer the converted call processing message to the call processing task of the central processing module CPM 10 through the common memory CM. The detailed procedure is as follows:

1) Upon receipt of an ISDN call control message from the call control entity, the call processing interface entity converts the received ISDN call control message into the corresponding call processing message of the central processing module CPM 10.

2) The call processing interface entity writes the converted call processing message in a transmission area of the common memory CM to send it to the call processing task of the central processing module CPM. At this time, if the call processing message to be sent is larger than a message block of the common memory CM, the call processing interface entity disassembles the message into segments, appends series numbers to the disassembled segments, respectively, and end-marks the last segment. Then, the call processing interface entity writes the segments sequentially one by one in the unit of a message block.

3) The call processing interface entity of the ISDN interface card INF transmits a common memory transmission (CMTX) interrupt CMTX INT to the central processing module CPM 10.

4) If the call processing interface entity transmits the common memory transmission interrupt CMTX INT to the central processing module CPM 10, a common memory reception (CMRX) interrupt service routine is driven. The interrupt service routine sets a desired flag in an event list to drive a task for the message reception from the common memory CM.

5) If the dispatch routine of the operating system receives the control operation, it drives the common memory reception task set in the event list. As the common memory reception task is driven, it reads the message from the common memory CM and stores the read message in its message buffer. In the case where the segment number of the read message is not the end mark, the common memory reception task assembles the segments into one message. Then, the common memory reception task checks a reception task identifier in the message to register the message in a message queue of the corresponding task. In other words, the common memory reception task registers the message in a message queue of the call processing task.

6) Under control of the task scheduling of the operating system, the call processing task reads the registered message from its message queue and processes the read message. As a result, the transmission interface function is completed.

As apparent from the above description, according to the present invention, the ISDN connection trunk card is provided to facilitate the intralayer and interlayer entity communications required in implementing the user/network interface for the connection of the private exchange to the ISDN public network.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A network interface card for interfacing a private exchange to an integrated services digital network, comprising:

an integrated services digital network interface for connecting to said integrated services digital network; and a private exchange interface connected to said private exchange having a subscriber shelf and a central processing module;

said network interface card having a layered architecture based on an open systems interconnections model, said network interface card being mounted in a universal card slot of said subscriber shelf for enabling voice and data communications between said private exchange and said integrated services digital network under control of said central processing module;

said network interface card further comprising a time switch controller connected to said private exchange interface, and at least one layer controller connected between said time switch controller and said integrated services digital network interface.

2. The network interface card of claim 1, said private exchange being constructed in a multi-node distributed manner with each respective node being constructed in a distributed control manner.

3. An apparatus for interfacing a private exchange with a central processing module to an integrated services digital network, comprising:

a network interface connected directly to said integrated services digital network;

an exchange main module interface for communicating with said central processing module of said private exchange;

a memory for storing call processing interface and integrated services digital network protocol control programs for the connection of said private exchange to said integrated services digital network;

a time switch controller connected to the exchange main module interface for controlling speech path connections between at least one B-channel of the network interface and at least one B-channel of the exchange main module interface, and for performing a conversion between a pulse code modulation interface frame structure and an integrated services digital network oriented modular interface frame structure;

a layer-1 controller connected between the time switch controller and the network interface for performing a conversion between a user/network interface frame structure and the integrated services digital network oriented modular interface frame structure; and a layer-2 controller connected between the time switch controller and the layer-1 controller for selectively controlling at least one D-channel, and for transferring a link access procedure on a D-channel frame received from a physical layer of an open systems interconnection reference model to a D-channel of the associated port, and reading D-channel data received at each port, producing a link access procedure on the D-channel frame on the basis of the read data, and transferring the produced link access procedure on the D-channel frame to the physical layer of the open systems interconnections reference model.

4. The apparatus of claim 3, said exchange main module interface including a common memory for exchanging signaling information with said central processing module of said private exchange.

5. The apparatus of claim 3, said layer-2 controller including a first-in-first-out memory for transmission/reception per D-channel to communicate with said physical layer and for requesting transmission and reception by interruption.

6. An apparatus for interfacing a private exchange to an integrated services digital network by operating a plurality of layers on the basis of an open systems interconnection reference model, comprising:

a layer-1 server for performing network access management. D-channel activation, and transmission and reception of a link access procedure for the D-channel through said D-channel;

a layer-2 server including a layer-2 entity for performing layer-2 initialization and configuration, data transmission and reception, terminal endpoint identifier management, error report, resource management and connection management, and a link access procedure for a D-channel entity for performing D-channel setting and release, transmission and reception of data through said D-channel, and D-channel flow and error controls;

a layer-3 server including a layer-3 entity for performing layer-3 initialization and configuration, and error and status reports, and a network entity for performing call setting and release, call control and rearrangement, and user data transmission;

a layer-4 server including a layer-4 entity for performing layer-4 initialization and configuration, and error and status reports, a call control entity for performing an upper layer function of a D-channel signaling protocol and a function of interfacing between a specific application task and an integrated services digital network protocol, and a call processing interface for interfacing with an exchange main module to perform a conversion between a control message based on an exchange call processing procedure and a control message based on an integrated services digital network call processing procedure;

a management server for managing all of said servers to perform entity activation and deactivation, resource management, parameter change and statistical data management; and an operating system for performing memory management, timer management, intertask communication and interrupt process.

7. The apparatus of claim 6, wherein each said server includes a server controller for controlling an entire operation of said each server, an external first-in-first-out queue for storing a message for interlayer entity communication, and an internal first-in-first-out queue for storing a message for intralayer entity communication, and each said server shares said operating system and a mailbox with other layer servers.

8. The apparatus of claim 7, wherein each of said interlayer and intralayer entity communication messages includes a transmission entity identifier, a reception entity identifier, a network access indicator, a service access point indicator, a connection identifier, a primitive code, a priority, a message retain/release control flag, an address of a next message registered in a corresponding queue, an address of a prior message registered in the corresponding queue, an address of an area for service provision, a start offset of message contents, a size of message contents, an address of message contents by a primitive code, a start offset of message segment in a buffer, a size of message segment in the buffer, a start address of a first buffer, and message contents.

9. The apparatus of claim 7, wherein a communication message between a private exchange and a call processing interface includes a message header, a system flag, a network access indicator, a message length, a reception entity identifier, a transmission entity identifier, a primitive code, a connection identifier, a message segment number and message contents.

10. In a private exchange having a central processing module, an integrated services digital network interface card and a common memory, said integrated services digital newtork interface card including layer-1 to layer-4 servers based on an open systems interconnection reference model, said layer-4 server including a call processing interface entity, a call control entity, an internal first-in-first-out queue, an external first-in-first-out queue and a mailbox, a method for transmitting and receiving signaling information to and from said central processing module through said layer-4 server, comprising the steps of:

(a) allowing said central processing module to write a call processing message in a reception area of said common memory to send the call processing message to said integrated services digital network interface card;

(b) allowing said central processing module to transmit a common memory reception interrupt to said integrated services digital network interface card;

(c) allowing said integrated services digital network interface card to produce a request message in response to the transmitted common memory reception interrupt from said central processing module to request message reception from said common memory and to register the produced request message in said mailbox of said layer-4 server; allowing said layer-4 server to read the registered request message from said mailbox and to transfer the read message to said call processing interface entity;

(d) allowing said call processing interface entity to check a primitive code of the transferred message, to read the call processing message from said reception area of said common memory if the transferred message is to request the message reception from said common memory, and to store the read message in a message buffer; and (e) allowing said call processing interface entity to convert the call processing message from said central processing module into an integrated services digital network call control message and to transfer the converted integrated services digital network call control message to said call control entity.

11. The method of claim 10, further comprising the step, if the call processing message to be sent is larger than a message block of said common memory, of disassembling the call processing message into segments, of appending series numbers to the segments, of end-marking the last segment, and of writing the resultant segments sequentially one by one in the unit of a message block.

12. The method of claim 10, further comprising the step, if a segment number of the read call processing message is not an end mark, of assembling segments into one message.

13. In a private exchange having a central processing module, an integrated services digital network interface card and a common memory, said integrated services digital network interface card including layer-1 to layer-4 servers based on an open systems interconnection reference model, said layer-4 server including a call processing interface entity, a call control entity, an internal first-in-first-out queue, an external first-in-first-out queue and a mailbox, a method for transmitting and receiving signaling information to and from said central processing module through said layer-4 server, comprising the steps of:

(a) allowing said call processing interface entity to receive an integrated services digital network call control message from said call control entity and to convert the received integrated services digital network call control message into a call processing message of said central processing module;

(b) allowing said call processing interface entity to write the converted call processing message in a transmission area of said common memory so as to send the converted call processing message to a call processing task of said central processing module;

(c) allowing said call processing interface entity to transmit a common memory transmission interrupt to said central processing module;

(d) allowing said central processing module to set a desired flag in an event list in response to the common memory transmission interrupt from said call processing interface entity so as to drive a task for the message reception from said common memory;

(e) allowing said message reception task to read the call processing message from said common memory, store the read message in its message buffer, and check a reception task identifier in the stored message to register the message in a message queue of said call processing task; and (f) allowing said call processing task to read the registered message from said message queue and process the read message.

14. The method of claim 13, further comprising, the step, if the call processing message to be sent is larger than a message block of said common memory, of disassembling the call processing message into segments, of appending series numbers to each of the disassembled segments, end-marking a last segment, and of writing the resultant segments sequentially one by one in the unit of message block.

15. The network interface card of claim 1, wherein said at least one layer controller comprises a first controller and a second controller, said first controller being connected between said time switch controller and said integrated services digital network( interface, and said second layer controller being connected between said time switch controller and said first layer controller.

16. The network interface card of claim 15, further comprising an additional controller connected in common to said integrated services digital network interface, said private exchange interface, said time switch controller, and said second layer controller, said network interface card further comprising a memory connected in common to said integrated services digital network interface, said additional controller, said time switch controller, said second layer controller and said private exchange interface.

17. The network interface card of claim 1, further comprising an additional controller connected in common to said integrated services digital network interface, said private exchange interface, said time switch controller, and said second layer controller, said network interface card further comprising a memory connected in common to said integrated services digital network interface, said additional controller, said time switch controller, said second layer controller and said private exchange interface.

18. The network interface card of claim 1, wherein said universal card slot has said network interface card and a subscriber interface card mounted therein.

* * * * *